(12) United States Patent
Borbely et al.

(10) Patent No.: US 9,352,988 B2
(45) Date of Patent: May 31, 2016

(54) PB$^{2+}$-ION BINDING BY POLYACID-BASED NANOPARTICLES

(76) Inventors: Janos Borbely, Debrecen (HU); Ildiko Schriffertne Denyicska, Debrecen (HU); Reka Melinda Molnar, Debrecen (HU); Magdolna Bodnar, Hajoluboszormeny (HU)

( * ) Notice: Subject to any disclaimer, the term of this patent is extended or adjusted under 35 U.S.C. 154(b) by 0 days.

(21) Appl. No.: 11/601,384

(22) Filed: Nov. 17, 2006

(65) Prior Publication Data

US 2008/0237135 A1  Oct. 2, 2008

Related U.S. Application Data

(60) Provisional application No. 60/737,606, filed on Nov. 17, 2005.

(51) Int. Cl.
*C02F 1/68* (2006.01)
*C02F 101/20* (2006.01)

(52) U.S. Cl.
CPC ............. *C02F 1/683* (2013.01); *C02F 2101/20* (2013.01); *Y10T 428/2982* (2015.01)

(58) Field of Classification Search
USPC ........................ 210/688, 749, 500.1
See application file for complete search history.

(56) References Cited

U.S. PATENT DOCUMENTS

| | | | | |
|---|---|---|---|---|
| 5,766,478 | A * | 6/1998 | Smith et al. | 210/638 |
| 6,533,938 | B1 * | 3/2003 | Dilorio et al. | 210/651 |
| 8,575,332 | B2 * | 11/2013 | Hahn et al. | 536/53 |
| 2008/0237135 | A1 * | 10/2008 | Borbely et al. | |

* cited by examiner

*Primary Examiner* — Chester Barry
(74) *Attorney, Agent, or Firm* — Thomas A. O'Rourke; Bodner & O'Rourke, LLP

(57) ABSTRACT

Methods are disclosed for preparing novel biodegradable nanoparticles based on complexation of poly-gamma-glutamic acid (γ-PGA) or its cross-linked derivatives with bivalent lead ions. The final products are stable in aqueous media at low pH, neutral and mild alkaline conditions. The size of the complexes depends on the pH, concentrations and the ratios of γ-PGA and lead ions
The γ-PGA nanoparticles made from biodegradable biopolymers with high flocculating and heavy metal binding activity of the present invention may be used for various water treatment applications in aqueous media.

19 Claims, 4 Drawing Sheets

PB²⁺-ION BINDING BY POLYACID-BASED NANOPARTICLES

The present application claims priority on U.S. Provisional patent application Ser. No. 60/737,606, filed Nov. 17, 2005, the disclosures of which are incorporated herein by reference.

FIELD OF THE INVENTION

The present invention relates to the formation of nanoparticles by complexation of poly-gamma-glutamic acid with lead ions, especially the formation of compositions comprising nano-sized complexes of poly-gamma-glutamic acid or its cross-linked derivatives that have been bound lead ions.

BACKGROUND OF THE INVENTION

Recently, reduction of water consumption by industry has been an important challenge. Also an important challenge is the purification of industrial waste waters containing heavy metals including lead. Enhanced ultra-filtration with polymers is a feasible method to remove metal ions from diluted wastewater streams. Biomacromolecules, biodegradable polymers as biomaterials have an important role in a wide range of industrial fields such as water treatment. For separation of toxic heavy metal ions, including lead ions, several natural polymers have been investigated. The most valuable properties of these biopolymers are their biocompatibility, biodegradability, and flocculating activity for metal ions.

Flocculation is a process that enhance agglomeration or collection of smaller floc particles into larger, more easily sedimentable particles through gentle stirring by hydraulic or mechanical means. The addition of flocculating agents may promote the formation of flocs. Flocculating agents that are usually used for water treatment can be categorized into three major groups, namely, inorganic flocculants, organic synthetic polymer flocculants, and natural biopolymer flocculants. Among these flocculants, organic synthetic polymers are widely used, because they are inexpensive and effective. However, the use of these flocculants may give rise to environmental and health problems, because some of them are not completely biodegradable, and the intermediate products of their degradation are toxic for humans. To solve these problems, biodegradable flocculants have been investigated to minimize the risk for the environment and humans.

Flocculation of polyelectrolytes in the presence of bivalent ions is an important process, and is widely used in water treatment technologies. For separation of toxic heavy metal ions, natural poly-γ-glutamic acid (γ-PGA) and other natural polymers have been investigated. The aggregate size distribution in flocculants was studied and it was found that it mainly depended on the pH and concentration of the electrolytes.

Poly-γ-glutamic acid consists of repetitive glutamic acid units connected by amide linkages between α-amino and γ-carboxylic acid functional groups. The secondary structure of PGA has been described as α-helix in a water solution. The naturally produced γ-PGA usually contains nearly equal amounts of D- and L-units and the molecular weight of the polymer is usually high (up to 1 million). The ratio of the two optical isomers can partially be controlled by technological means so that polymers with varying degree of stereoregularity can be made. γ-PGA is different from other proteins, in that glutamate is polymerized via the γ-amide linkages, and thus is synthesized in a ribosome-independent manner.

γ-PGA is a water soluble, biodegradable, edible and non-toxic polyanion for the environment and humans. Therefore, the potential applications of γ-PGA and its derivatives have been in the limelight in the past few years in a wide range of industrial fields such as cosmetics, food, medicine, and water treatment.

The γ-PGA as a polyacid has appropriate flocculating activity, high affinity and binds proportional toxic heavy metal ion, such as lead ions. Therefore, the biopolymer may be useful for treating wastewater.

SUMMARY OF THE INVENTION

The present invention relates to formation of stable nanoparticles by complexation of poly-gamma-glutamic acid or its derivatives with lead ions, especially the formation of compositions comprising nano-sized complexes.

The γ-PGA-lead complexes may form more or less stable colloids in aqueous media depending on the pH, and the concentrations of γ-PGA and lead ions in the mixture. In aqueous solution the average size of the particles varies and is strongly dependent on the pH, the concentrations and the ratios of γ-PGA and $Pb^{2+}$. Molecular weight of the γ-PGA was an important factor for size and stability of complexes. High concentrations of γ-PGA and lead ions promoted the formation of large aggregates and the system contains species with a broad size distribution. The results showed that low and high pH values in mixtures with high concentrations of γ-PGA and $Pb^{2+}$ ions favored the growth of large complexes.

The present invention is also directed to compositions containing poly-γ-glutamic acid in the form of a network of a nano-sized, biocompatible and biodegradable particles. These nanosized particles are obtained by the complexation of poly-γ-glutamic acid with heavy metal ions. One type of heavy metal ion that is particularly suitable for use with the poly-γ-glutamic acid are lead ions. The nano-size particles formed in accordance with the process of the present invention have an average diameter ranging from about 10 nm to about 300 nm, as determined by transmission electron microscopic imaging. The nano-size particles of the present invention have an average diameter ranging from about 10 nm to about 500 nm, as determined by dynamic light scattering.

Stable colloid systems in aqueous media are obtained when the γ-PGA particles are complexed with bivalent lead ions at diverse stoichiometric ratios and concentrations. The poly-γ-glutamic acid used in the present application preferably has a molecular weight of between about 50 kDa and about 1.5 MDa. The poly-γ-glutamic acid used in the in the formation of the network of a nano-sized, biocompatible and biodegradable particles of the present invention can preferably be crosslinked.

The cross-linked nanoparticles from γ-PGA are preferably prepared with 2,2'-(ethylenedioxy)bis(ethylamine) as a cross-linking agent. The amount of crosslinking is from 1%-100%, preferably from about 1% to about 99%, more preferably about 20% to about 70% crosslinking and most preferably from about 35% to about 60% crosslinking.

DETAILED DESCRIPTION OF THE INVENTION

Figure 1:
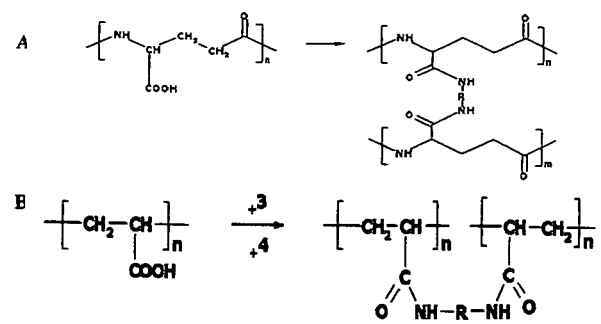
FIG. 1 shows the structure of examples of the polymers that were investigated.

γ-PGA is different from other proteins, in that glutamate is polymerized via the γ-amide linkages, and thus is synthesized by a ribosome-independent manner. The location of genes responsible for PGA synthesis is a matter of controversy: they were reported to be present in the genomic DNA, while others suggested they are carried in plasmids.

Biosynthesis of PGA is not entirely understood either. The most likely model of D-glutamic acid formation involves a series of glutamyl transamidation and alanine racemization reactions. A pyruvic acid aminotransferase reacts with L-glutamic acid and pyruvic acid to form α-ketoglutaric acid and L-alanine. L-alanine is subsequently converted into its D-form, which then reacts with α-ketoglutaric acid that yields D-glutamic acid and pyruvic acid. Transfer of the glutamyl group from L-glutamine to either D- or L-glutamic acid or to a glutamyl dipeptide is catalyzed by a glutamyl transamidase and results in the formation of glutamyl di- and tripeptides, respectively. It was further shown that a transpeptidase reaction between γ-glutamyl dipeptides forming γ-glutamyl dipeptides of longer chain length was catalysed by a glutamyl transpeptidase. To sum up, a series of transamidation and transpeptidation reactions are believed to be responsible for the synthesis of the polyglutamyl polymers in B. licheniformis, while α-ketoglutaric acid is apparently a key intermediate.

The starting material of the present invention is a polycarboxylic acid, the γ-PGA, which was produced by Bacillus licheniformis, strain ATCC 9945a, which was maintained on 1.5% (w/v) Bouillon-agar slants.

Submerged cultivations were carried out in either a laboratory fermentor with 15 liters total/12 liters useful volume (New Brunswick Scientific, New Brunswick, N.J., U.S.A.), or in 500 ml Erlenmeyer flasks. The fermentation medium for all cultivations contained 20 g/l glutamic acid, 26.3 g/l citric acid.$H_2O$, 7 g/l $NH_4Cl$, 0.5 g/l $K_2HPO_4$, 0.5 g/l $MgSO_4.7H_2O$, 0.15 g/l $CaCl_2.2H_2O$, 0.08 g/l $MnSO_4.H_2O$, 0.05 g/l $FeSO_4.7H_2O$, 80 g/199.5% glycerol. The temperature was maintained at 37° C., and the pH was adjusted to 7.4 with NaOH prior sterilization.

Flasks were directly inoculated with 10% vegetative B. licheniformis spores with a final concentration of up to $10^7$ per ml and were kept on a New Brunswick orbital shaker at 200 rpm. Laboratory-scale fermentors were inoculated with 5% 14.5 hours-old seed cultures that were formed in shaker-flasks as described above. Aeration in the fermentor was carried out by purging air at 5 liters/min and stirring with two conventional, six-blade disk turbine impellers at 1000 rpm. Cultivations were carried out for 164 hours.

Although the technical means to modify the oxygen transfer rate in a series of 500 ml shake-flasks are limited, varying the ratio of flask to medium volume does change the volumetric oxygen transfer coefficient (Kla) and could result in a gradient of oxygen input. High volumes within flasks lower specific oxygen transfer rate.

Growth (microbial biomass formation) was followed by the changes in the optical density of culture aliquots measured at $\lambda=600$ nm. Volumetric oxygen transfer coefficient (Kla) values of the shake-flasks (characterized in Table I.) were determined by the sulphite-oxidation method. The resulting culture medium was centrifuged at 10,000 rpm for 80 min and was filtered through a 0.01 μm pore size nitrocellulose membrane under vacuum, to remove the bacterial biomass.

PGA was precipitated by the addition of one and a half volume of acetone to the filtrate. The PGA was re-dissolved in water, dialyzed against distilled water and freeze-dried.

Because the resulting product is very hygroscopic and is in fact composed of free PGA acid (PGA-H) and sodium salt of PGA (PGA-Na) in an unknown ratio (with possibly some higher valence cations bound to the carboxylic groups), part of the PGA was further purified and converted to the free acid form by treatment with ion-exchange resin. 100 g of Amberlite 15 (macroreticular cation-exchange resin in $H^+$ form) was mixed with 5 liters of partially purified PGA in solution and stirred for 30 minutes at room temperature. After decantation, PGA solution was mixed again with a new batch of resin and the process repeated twice. The resulting PGA-H solution is acidic (pH of about 2.8) and has a much lower viscosity than the initial PGA-Na-PGA-H mixture. Anions from the fermentation medium were removed by dialysis against water for several days. Subsequent freeze-drying yielded pure PGA-H which is practically not hygroscopic.

After freeze drying, aqueous solution were prepared from γ-PGA. γ-PGA solution (c≤10 mmol, pH=2.6) and $Pb(NO_3)_2$ solution (c≤5 mmol, pH=2.3) were produced and used for preparation of γ-PGA nanoparticles by lead ion complexation. $Pb(NO_3)_2$ solution was added to the γ-PGA solution dropwise at different ratios. The mixture was diluted and the pH was adjusted to the desired pH value with 0.1 M sodium hydroxide solution. The reaction mixture was stirred at room temperature. Formation of γ-PGA particles with bivalent lead ions at diverse stoichiometric ratios and concentrations were made.

The extent of complexation is determined by the concentration of solutions and the ratio of γ-PGA and lead ions. These complex formations can be performed at different ion concentrations.

Nanoparticles were also made by complexation of cross-linked γ-PGA derivatives and lead ions. The γ-PGA was cross-linked with 2,2'-(ethylenedioxy)bis(ethylamine). The reaction took place in water in the presence of water soluble 1-(3-(dimethylamino)propyl)-3-ethyl-carbodiimide hydrochloride). The cross-linking was performed in different proportions, from 1% to 100% relative to the carboxylic groups of γ-PGA. The reaction mixture was stirred at room temperature for 24 h. The solutions containing cross-linked γ-PGA nanoparticles were purified by dialysis for 7 days against distilled water and freeze-dried.

This method is similar to the complexation of original γ-PGA and lead ions: cross-linked γ-PGA solution (c≤10 mmol, pH=2.6) and $Pb(NO_3)_2$ solution (c≤5 mmol, pH=2.3) were produced and used for preparation of cross-linked γ-PGA nanoparticles by lead ion complexation. $Pb(NO_3)_2$ solution was added to the solution containing cross-linked γ-PGA dropwise at different ratios. The mixture was diluted and the pH was adjusted to the desired pH value with 0.1 M sodium hydroxide solution. The reaction mixture was stirred at room temperature. Formation of γ-PGA particles with bivalent lead ions at diverse stoichiometric ratios and concentrations were made.

EXAMPLE 1

Preparation of γ-PGA Solution

γ-PGA was dissolved in distilled water to produce γ-PGA solution, concentration was between 0.5 and 10 mmol. The pH was adjusted to 2.6 with HCl solution.

EXAMPLE 2

Nanoparticles by Complexation of γ-PGA and Lead Ions

γ-PGA solution (c=6 mmol, pH=2.6) and Pb(NO$_3$)$_2$ solution (c=3.125 mmol, pH=2.3) were produced and used for preparation of γ-PGA nanoparticles by lead ion complexation. 4 ml Pb(NO$_3$)$_2$ solution was added to the 12.5 ml γ-PGA solution dropwise. The mixture was diluted to 50 ml and the pH was adjusted to the pH=3.0 value with 0.1 M sodium hydroxide solution. The reaction mixture was stirred at room temperature.

EXAMPLE 3

Nanoparticles by Complexation of γ-PGA and Lead Ions

γ-PGA solution (c=6 mmol, pH=2.6) and Pb(NO$_3$)$_2$ solution (c=3.125 mmol, pH=2.3) were produced and used for preparation of γ-PGA nanoparticles by lead ion complexation. 4 ml Pb(NO$_3$)$_2$ solution was added to the 6.25 ml γ-PGA solution dropwise. The mixture was diluted to 50 ml and the pH was adjusted to the pH=7.0 value with 0.1 M sodium hydroxide solution. The reaction mixture was stirred at room temperature.

EXAMPLE 4

Partial Cross-Linking of γ-PGA (50% of the Free Carboxylic Groups are Reacting)

100 mg γ-PGA was dissolved in 50 ml of water to produce 10 mg/ml solution and then neutralized to pH 6.5 with 0.1 M sodium hydroxide. After the addition 115 mg of water soluble carbodiimide, the reaction was stirred at room temperature for 30 min and subsequently mixed with 29 µl of 2,2'-(ethylenedioxy)bis(ethylamine) at ambient temperature for 24 hours. After this time the resulting solution containing cross-linked nanoparticles was purified by dialysis for 7 days against distillated water and freeze dried.

EXAMPLE 5

Partial Cross-Linking of γ-PGA (10% of the Free Carboxylic Groups are Reacting)

100 mg γ-PGA was dissolved in 50 ml of water to produce 10 mg/ml solution and then neutralized to pH 6.5 with 0.1 M sodium hydroxide. After the addition 23 mg of water soluble carbodiimide, the reaction was stirred at room temperature for 30 min and subsequently mixed with 6 µl of 2,2'-(ethylenedioxy)bis(ethylamine) at ambient temperature for 24 hours. After this time the resulting solution containing cross-linked nanoparticles was purified by dialysis for 7 days against distillated water and freeze dried.

EXAMPLE 6

Nanoparticles by Complexation of Cross-Linked γ-PGA and Lead Ions

Cross-linked γ-PGA solution (c=6 mmol, pH=2.6) and Pb(NO$_3$)$_2$ solution (c=3.125 mmol, pH=2.3) were produced and used for preparation of nanoparticles by complexation with lead ion. 2 ml Pb(NO$_3$)$_2$ solution was added to the 6.25 ml γ-PGA solution dropwise. The mixture was diluted to 50 ml and the pH was adjusted to the pH=3.0 value with 0.1 M sodium hydroxide solution. The reaction mixture was stirred at room temperature.

EXAMPLE 7

Nanoparticles by Complexation of Cross-Linked γ-PGA and Lead Ions

Cross-linked γ-PGA solution (c=6 mmol, pH=2.6) and Pb(NO$_3$)$_2$ solution (c=3.125 mmol, pH=2.3) were produced and used for preparation of nanoparticles by complexation with lead ion. 2 ml Pb(NO$_3$)$_2$ solution was added to the 3.125 ml γ-PGA solution dropwise. The mixture was diluted to 50 ml and the pH was adjusted to the pH=7.0 value with 0.1 M sodium hydroxide solution. The reaction mixture was stirred at room temperature.

EXAMPLE 8

Removal of Toxic Heavy Metal Ions by Microfiltration

Use and reuse of water requires purification to remove chemical and biological hazardous components. Industrial wastewater and groundwater must be treated before discharge. Development of new materials and techniques with increased affinity, capacity and selectivity for heavy metals is forced because the conventional technologies are often inadequate to reduce concentrations in wastewater to acceptable regulatory standards.

A clear solution was obtained by mixing the solutions of PGA and lead nitrate at pH=2.3. At this pH no lead binding occurred. By adjusting the pH to 4.0, an opaque aqueous dispersion was immediately formed; this demonstrates complex formation. The colloid dispersions were stable for at least one week. Ultrafiltration of samples was performed after 24 hours. Ultrafiltration membrane (62 mm in diameter) made of polyethersulfone was obtained from Amicon Co. having MWCO of 30,000 Da.

The permeate was clear, while the retentate remained an opaque dispersion. Concentration of lead ions was measured by ICP and is summarized in Table 1. The distribution of the lead ions demonstrates that PGA has high affinity for lead ions. When the retentate was acidified, a clear solution was obtained and the polymer was recovered.

EXAMPLE 9

Experimental

Materials. Pb(II)salt was Pb(NO$_3$)2 dissolved in distilled water, The water soluble chelating polymer used was poly gamma glutamic acid (PGA) and crosslinked poly gamma glutamic acid. The average molecular weight of PGA was determined to be 1 million by gel permeation chromatography. and poly(acrylic acids) PAA (Mw=1×100 kDa, 4.5×100 kDa and 7.5×100 kDa). Acrylic acid (AA)-co-Bis-[2-(methacryloyloxy)-ethyl]phosphate (BMOEP) was another nanoparticle that was investigated. Reagents for crosslinking were CDI: 1-(3 (dimethylamino)propyl)-3-ethyl-carbodiimide methiodide, EDBEA: 2,2'-(ethylenedioxy)bis(ethylamine). A dialysis membrane of spectra/por (Spectrum Medical Industries; molecular weight cut-off: 12 kDa-14 kDa) was used.

Reaction Conditions

Different proportions of CDI, EDBEA (2%, 5%, 15%, 25%, 50%, 100%)

Ambient temperature;

Reaction time: 24 hours;

The reaction takes place in water;

The reaction mixture was stirred;

The resulting polymer solution was dyalised for 7 days against water, and freeze-dried. Ion binding was measured by dialysis method. Concentration of residual toxic heavy metal was measured by PAR reagent and UV-VIS photometry Methods for Measurements:
 NMR spectroscopy;
 FT-IR spectroscopy;
 Transmission electron microscopy (TEM);
 UV-VIS Photometry

EXPERIMENTAL

Figure 2:
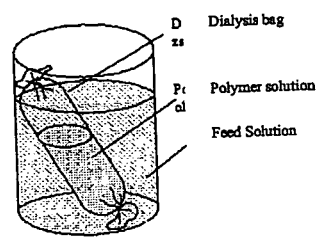
FIG. 2 shows the water-soluble chelating polymer retained into dialysis tubing (recovery cell).

FIG. 1 shows the structure of the polymers that were investigated. FIG. 2 shows the water-soluble chelating polymer retained into dialysis tubing (recovery cell). This was immersed into 200 ml sample solution (feed cell) that contains the lead ions placed inside a beaker which was stirred with a magnetic stirrer at a constant speed. The concentration of lead ion was 5 ppm in experiments, and polymer in the recovery cell was 11.5 mg in 30 ml of water. FIG. 1 shows the formation of nanoparticles by crosslinking reactions. A: from PGA (PGANPs); and B: from polyacrylic acid (PAANPs).

The experimental runs were carried out in the presence and absence of the chelating polymer in the recovery cell. The time course of change in concentration of metal ions in the feed cell was determined by sampling at fixed Intervals, and measuring concentrations of the metal ions by spectrophotometry using a solution of as PAR indicator. FIG. 2 is a Diagram of experimental setup (1) water-soluble polymer (2) lead nitrate dissolved in distilled water (3) Beaker

RESULTS AND DISCUSSION

Figure 3:
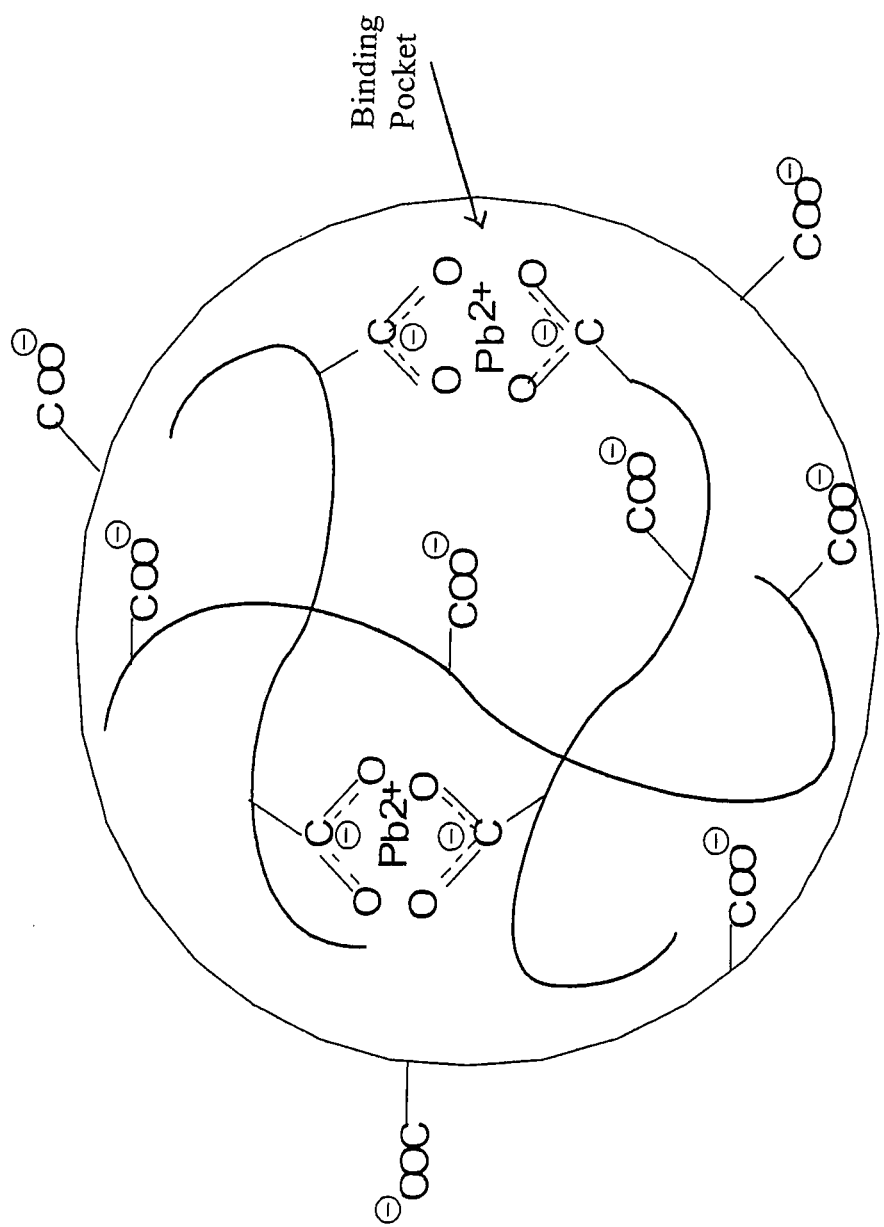
FIG. 3 is a representation as to how crosslinked nanoparticles form complex bonds with free carboxylic groups and with the peptide bond. Surface complexation and binding inside the particles may occur.
Figure 4:
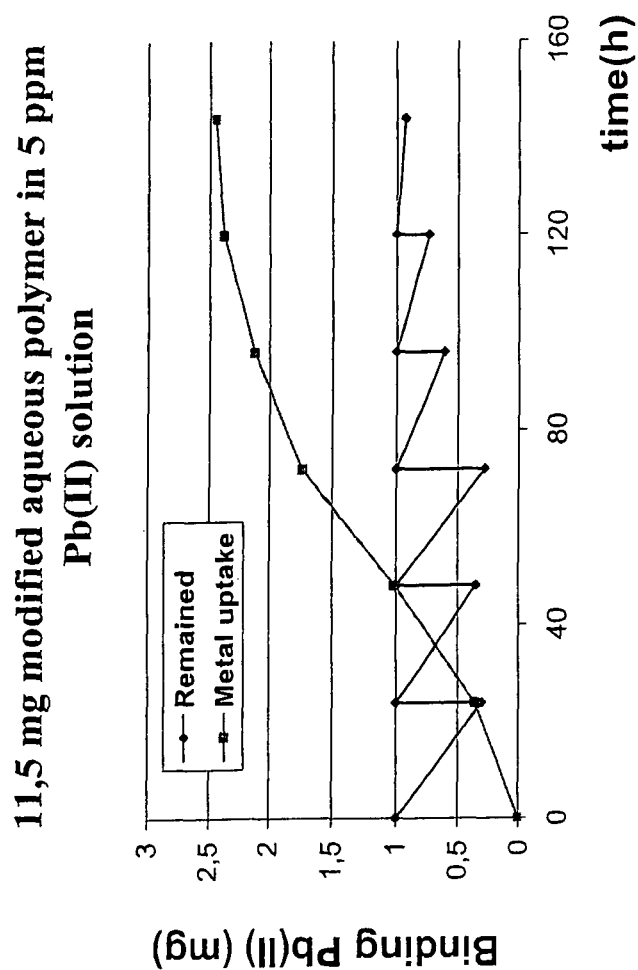
FIG. 4 shows the binding of toxic heavy metal ions by modified PAA
Figure 5:
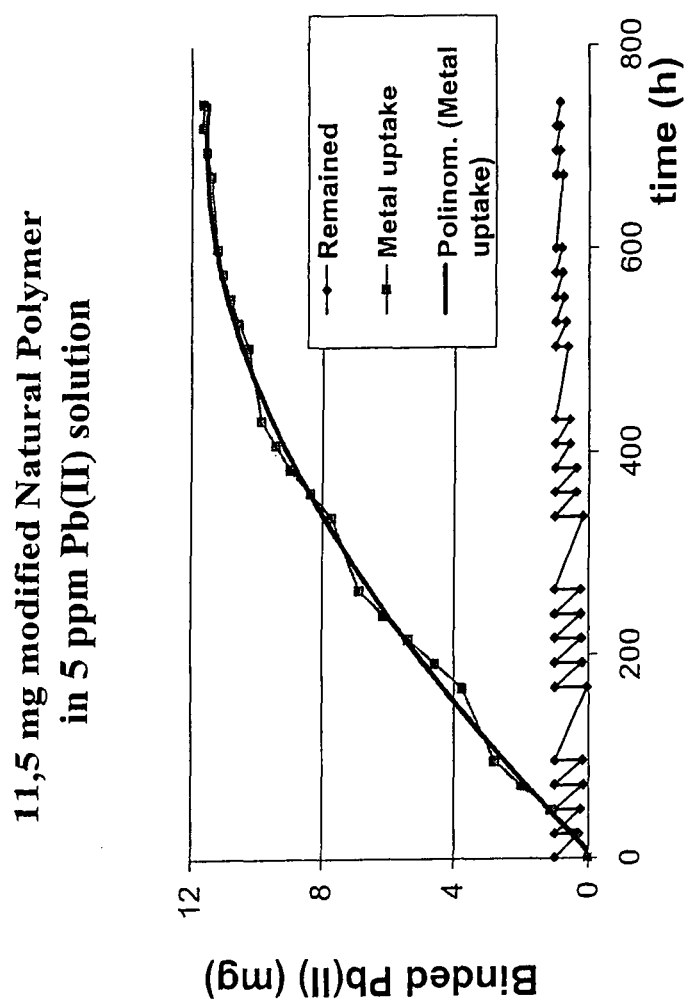
FIG. 5 shows the binding of toxic heavy metal ions by modified PGA.

A dialysis membrane allows complete permeation of only metal ions with no permeation of chelating polymer or metal-polymer complexes. Therefore metal ions should be concentrated in the recovery cell. At lower pH (e.g. pH=2) the complex stability decreases and lead ions are not attracted by the polymers. For heavy metal binding purposes polymer based colloid particles have been designed. These particles, in a range of 40-250 nm, involve chelating group to bind pollutants. Typical results of the time courses of ion concentration decrease in the feed cell are shown in FIGS. 4 and 5. In the absence of a water-soluble chelating polymer, the concentration in both cells approach equilibrium, but almost all metal ions in the feed cell were recovered using the modified polymer (PGA) and (PAA). FIG. 3 shows the highest concentration of lead was 5 ppm. The zig-zag line shows the decrease of the lead concentration in the feed cell during time intervals with adjustment of the lead to initial concentration every 24 hrs. The final measurement shows that the uptake still continues before equilibrium occurs. FIG. 5 shows the uptake of lead by natural biopolymer produced by biotechnology process in our laboratory. The same protocol described above was used but with longer time courses even after equilibrium occurred. The observed intervals were 98-170 hours and 268-340 hours the lead concentration approached to zero and the lead concentration was continued to be adjusted in the feed cell to 5 ppm until equilibrium take placed.

Table 2 shows the binding capacity of synthetic (AA-co-BMOEP), natural (PGA) and modified natural biopolymer (PGANP). FIG. 3 shows crosslinked nanoparticles form complex bonds with free carboxylic groups and with the peptide bond. Surface complexation and binding inside the particles may occur.

FIG. 4 shows the binding of toxic heavy metal ions by modified PAA

FIG. 5 show the binding of toxic heavy metal ions by modified PGA.

TABLE 1

$Pb^{2+}$ concentrations measured by ICP method

| Sample | Volume (ml) | $Pb^{2+}$ concentration (ppm) |
|---|---|---|
| Starting solution | 120 ml | 330.5 |
| Permeate | 100 ml | 8.3 |
| Retentate | 18 ml | 295.5 |

TABLE 2

| POLYMER | Binding $Pb^{2+}$ (mg) | Binding $Pb^{2+}$ On the polymer (mg/mg) | Binding $Pb^{2+}$ on the polymer (mol/g polymer × $10^3$) |
|---|---|---|---|
| PMAA-co-BMOEP | 1.71 | 0.148 | 0.714 |
| PGA | 6.29 | 0.547 | 2.64 |
| PGA crosslinked at 10% | 12.14 | 1.056 | 5.1 |

What is claimed is:

1. A method of removing heavy metal ions from an aqueous solution comprising adding to an aqueous solution containing heavy ions a sufficient quantity of cross-linked poly-γ-glutamic acid to form a colloid dispersion, wherein said cross-linked poly-γ-glutamic acid is cross-linked with 2.2'-(ethylenedioxy)bis(ethylamine) in water in the presence of water soluble 1-(3-(diethylamino)propyl)-3-ethyl-carbiimide hydrochloride), and filtering the mixture to remove the colloid dispersion.

2. The method according to claim 1 wherein the pH of the aqueous solution is in the range of 3 to about 7.

3. The method according to claim 2 wherein the heavy metal ion is lead.

4. The method according to claim 3 wherein an ultrafiltration membrane is used to filter the mixture.

5. The method according to claim 4 wherein the ultrafiltration membrane is comprised of a polyethersulfone.

6. The method according to claim 5 wherein the polyethersulfone has a MWCO of about 30,000 Da.

7. The process according to claim 3 wherein the lead ions are bivalent lead ions.

8. The method according to claim 3 wherein the cross-linked poly-γ-glutamic acid reacts with lead nitrate.

9. The method according to claim 1 wherein the percentage of crosslinking ranges from about 1% to about 99%.

10. A method of removing heavy metal ions from an aqueous solution comprising adding to an aqueous solution containing heavy ions a sufficient quality of cross-linked poly-γ-glutamic acid to form a colloid dispersion, and filtering the mixture to remove the colloid dispersion, and wherein said colloidal dispersion contains nano-sized particles having an average diameter ranging from about 10 nm to about 300 nm, as determined by transmission electron microscopic imaging.

11. A method of removing heavy metal ions from an aqueous solution comprising adding to an aqueous solution containing heavy ion a sufficient quantity of cross-linked poly-γ-glutamic acid to form a colloid dispersion, and filtering the mixture to remove the colloid dispersion, and wherein said colloidal dispersion contains nano-sized particles having an average diameter ranging from about 10 nm to about 500 nm, as determined by dynamic light scattering.

12. A method of removing heavy lead ions from an aqueous solution comprising adding to an aqueous solution containing lead ions a sufficient quality of cross-linked poly-γ-glutamic acid to form a colloid dispersion, and filtering the mixture to remove the colloid dispersion and wherein the pH of the aqueous solution is in the rang of 3 to about 7 and wherein said cross-linked γ-PGA has a binding capacity with lead ions of 12.14 mgs.

13. The method according to claim 11 wherein the pH of the aquesous solution is in the range of 3 to about 7.

14. The method according to claim 13 wherein the heavy metal ion is lead.

15. The method according to claim 14 wherein an ultrafiltration membrane is used to filter the mixture.

16. The method according to claim 15 wherein the ultrafiltration membrane is comprised of polyethersulfone.

17. The method according to claim 16 wherein the polyethersulfone has a MWCO of about 30,000 Da.

18. The method according to claim 14 wherein the lead ions are bivalent lead ions.

19. The method according to claim 14 wherein the cross-linked poly-γ-glutamic acid reacts with lead nitrate.

* * * * *